Nov. 21, 1944.  E. T. CARLSON  2,363,396
ELECTRICAL DISTRIBUTION SYSTEM
Filed July 12, 1941  2 Sheets-Sheet 2
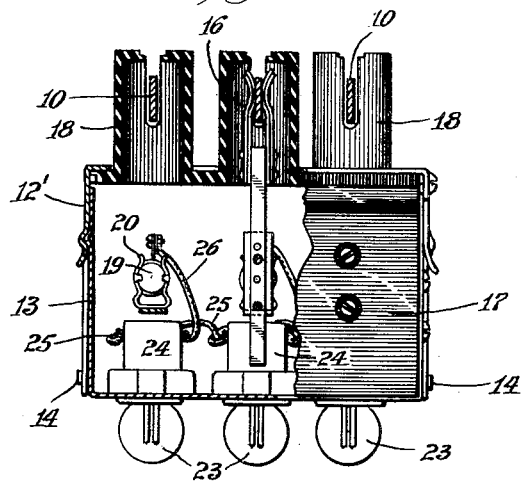
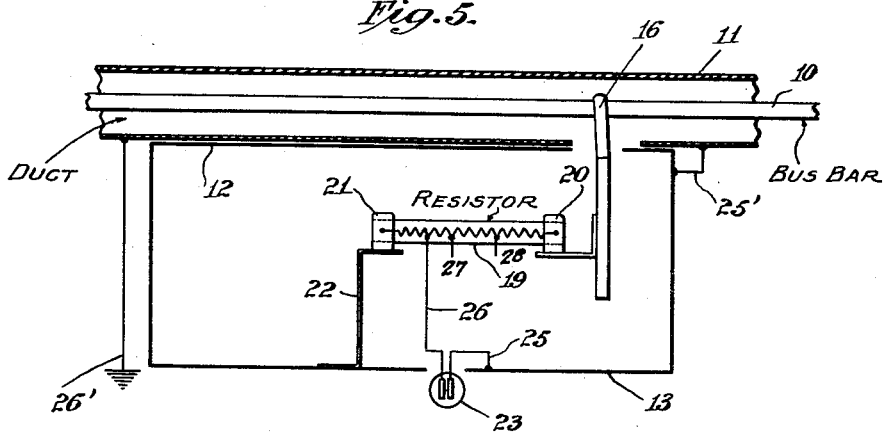
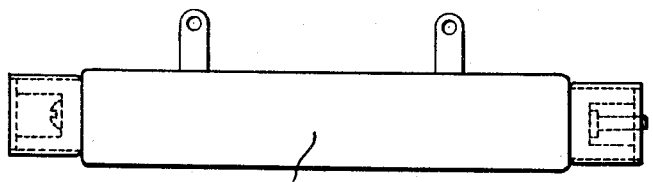
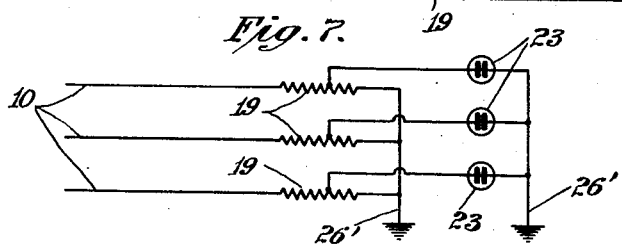
INVENTOR
Elmer T. Carlson
BY
ATTORNEY Patented Nov. 21, 1944

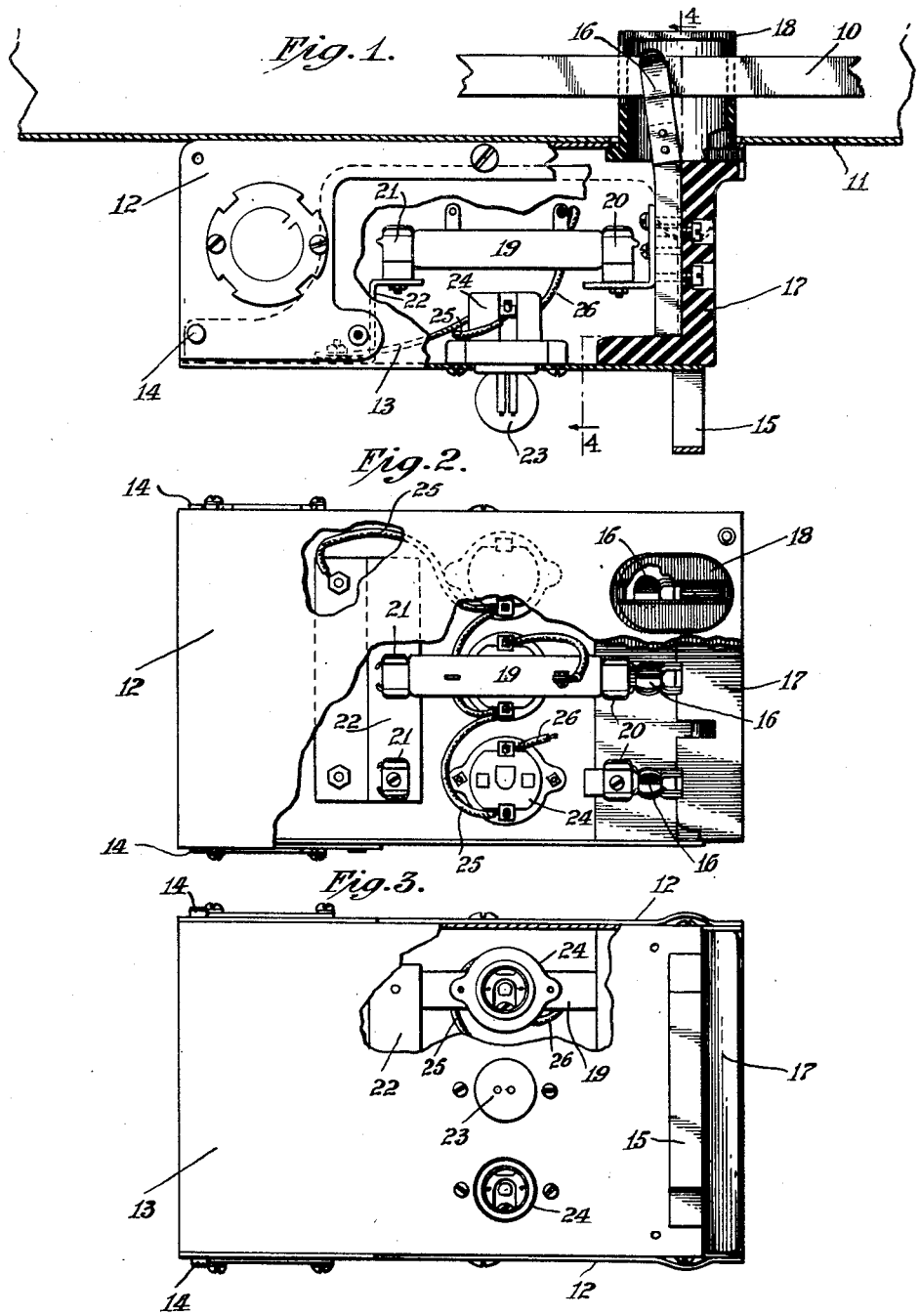

2,363,396

UNITED STATES PATENT OFFICE 2,363,396

ELECTRICAL DISTRIBUTION SYSTEM

Elmer T. Carlson, Fort Mitchell, Ky., assignor to The Trumbull Electric Manufacturing Company, Plainville, Conn., a corporation of Connecticut Application July 12, 1941, Serial No. 402,137

5 Claims. (Cl. 177—311)

My invention relates particularly to means for indicating the condition of enclosed bus bar systems.

The main object is to provide a method or means for readily disclosing or indicating the condition existing in a bus bar distribution system of the enclosed type. Such systems involve main distribution lines with provision for convenient connection of branch circuits at various points to supply electrical energy to desired locations.

It is highly important that such systems be maintained in fully operative condition at all times. The slightest interference or interruption may shut down an entire plant and result in disruption of highly important operations. It is of course desirable that the system be constructed to avoid all possible interruptions. In case there is any difficulty, the inspector or supervisor should be instantly made aware of that fact so that a repair or correction may be made.

I have accordingly sought to provide a system in which the condition of the distribution system is at all times indicated visually in the plant and at various points in the circuit.

The drawings illustrate a simple form of construction adapted to be readily applied to an enclosed bus bar system at any point.

Fig. 1 is a longitudinal sectional and side view of one form of device embodying my invention, parts being broken away.

Fig. 2 is a top plan of the same, parts being broken away.

Fig. 3 is a bottom view of the same, parts being broken away.

Fig. 4 is an end view partly in transverse section.

Fig. 5 is a diagrammatic view illustrating the electric circuit of the device of Figs. 1 to 4.

Fig. 6 is a detail side view of one of the resistors.

Fig. 7 is a schematic diagram showing the electrical circuits of the bleeders and lamps to ground.

The invention is applicable to a system employing any number of bus bars. I have shown it as applied to a 3-wire system but it will be necessary to describe its application to a single line only.

The bus bar 10 is suitably supported within the duct or conduit 11 in any suitable manner, the form of the duct also being unimportant. This duct is usually of sheet metal and grounded at various points.

The protective and indicating device in the form shown has a box body 12 adapted to be removably secured to the duct 11 in any suitable manner. The box body and the duct are electrically connected with one another as indicated schematically by wire 25', but such connection may of course be made by mere physical contact of the box and the duct. A movable part 13 of the box may be conveniently hinged at 14 to the body and provided with a handle 15 to facilitate opening and closing in order to inspect the parts mounted within and to disconnect the device. A spring catch 12' is provided to assist in resiliently holding the part 13 to the part 12.

A contact blade or stab 16 is suitably secured within the box and may be conveniently carried by an insulating end piece 17. The duct of course is provided with an opening to permit of the insertion of the contact blade and a protective housing 18 of insulating material may also be provided and secured in place in any suitable manner so as to substantially surround the blade 16 particularly when the blade is in contact with the bus bar.

Within the box is mounted a resistor 19 for purposes more fully set forth in the Samer Patent No. 2,148,136, dated February 21, 1939. This resistor is conveniently mounted in clips 20 and 21, the clip 20 being mechanically and electrically connected with and supported by the base of the contact blade 16 and the other clip 21 being supported by a bracket 22 which is mechanically and electrically connected with the cover 13 of the box or housing so that one end of the resistor is grounded to the box and the duct.

The indicators for the various lines are supported in this box and are preferably in the form of neon lamps 23, of the gas filled cathode glow type, one lamp being provided for each line. For convenience, a socket 24 is provided for each lamp and the socket is mounted inside the cover of the box with its entrance exposed so as to permit insertion and removal of the lamp bulbs without disturbing the box. Each lamp has one electrode connected by conductor 25 to the box so that it is grounded. The other electrode is connected by conductor 26 to a point of the resistor, the potential of which is suitable for the voltage rating of the lamp. As shown in Fig. 5, several taps may be provided as at 26, 27, 28, in order that the device may be used on systems having various voltages. 25' indicates the connection of the box to the duct, which is grounded as shown at 26'.

In normal operation, all of the lamps will be lighted. If there is a single phasing of the main circuit, i. e. if one of the bus bars becomes de-energized, the light on the dead phase or line will go out. Of course if a lamp itself should burn out or work loose it will go out and require attention. If there is a dangerous ground on a leg of a circuit, the lamp on that particular leg will be extinguished. Any of these conditions requires a check up to be made.

Fig. 7 clearly indicates the metallic path to ground afforded by each resistor and the reduced potential path to ground through each indicating glow lamp.

Preferably I employ these glow lamps as the indicators because of their great economy and long life, but other types of electric lamps, preferably of low power consumption, may alternatively be used.

It will be seen that the construction is such that it may be attached to any existing installation of the enclosed type in the same manner as an ordinary branch circuit plug.

It will also be seen that the resistors and the connections are all mounted within an enclosure so that the connection contact blades or stabs 16 must be completely disconnected before servicing, thus ensuring safety. The grounding of the lines through the resistors, whose resistance values are low in relation to the normal high resistance of the circuit to ground, neutralizes or discharges dangerous potentials which frequently occur in such electrical systems due to surge voltages or to the collection of electrostatic charges on the lines.

In an alternating current system indicating lamps connected from each phase to ground through taps on the neutralizing resistors provide means for determining dangerous grounds on the electrical distribution system. Further, these lamps are so connected that should they fail, the resistors will nevertheless continue to provide protection against surge voltages. The action of the lamps is to go out on any phase on which a dangerous ground occurs in the system, as well as go out if that phase becomes "dead."

Because the box is made readily removable from the bus bars and from their enclosure, in the same manner that a branch circuit plug is made removable, this box may be shifted to the most desirable location in the distribution system, removed for complete and safe inspection away from the live bus bars, or replaced by another box, as conditions warrant.

I claim:

1. In a high voltage electrical distribution system, having a grounded conductor and an ungrounded conductor, a grounded casing, a combination protective leakage and indicating means supported in the casing including an electrical resistor connected from the ungrounded conductor of said system to the grounded casing and an indicating lamp connected between said casing and a point upon said resistor electrically intermediate the ends thereof, the potential of said point being suitable for the voltage rating of the lamp whereby the potential upon said lamp is under substantially all conditions maintained less than the potential of said ungrounded conductor.

2. A combination protective leakage and indicating electrical arrangement for use upon distribution systems, including a grounded casing, a resistor in the casing, means for impressing a relatively high electric potential upon one end of the resistor, means for grounding the other end thereof on the casing, and relatively unstable electrical indicating means mounted in the casing and connected between an intermediate point of said resistor and the ground, said point having a potential suitable for the voltage rating of the indicating means whereby said resistor functions as a relatively stable metallic leakage path to ground and whereby said indicating means is supplied with an electric potential relatively lower than that supplied to the non-grounded end of said resistor.

3. A combined bleeder and indicator arrangement adapted for use with distribution systems of varying voltages having a grounded conductor and an ungrounded conductor including a grounded casing, a resistor in said casing and connected at one end to the ground, a gas discharge lamp mounted in the casing and connected at one terminal to the ground, means for connecting the other end of said resistor to the ungrounded conductor of the system and means for connecting the other terminal of said lamp to a predetermined point of said resistor carrying a voltage lower than the voltage of the conductor to which said resistor is connected, said predetermined point being selected according to the voltage of the particular system to which said device is connected, the potential of said point being suitable for the voltage rating of the lamp whereby the maximum voltage impressed upon said lamp is at all times materially lower than the voltage carried by said ungrounded conductor of the system and is substantially unaffected by changes in the resistance of said lamp.

4. A combined protective and indicating apparatus, for association with an enclosed bus bar distribution system, comprising a grounded metallic casing in a circuit of the system containing two terminals, one terminal being grounded to the casing and a contact connected to the other terminal and adapted to engage a bus bar of the system, a resistor inserted between said terminals and an indicating lamp supported by the casing and having one electrode grounded on the casing and the other electrode connected to the resistor intermediate its terminals, at a point the potential of which is suitable for the voltage rating of the lamp, the resistance value of the resistor being low in relation to the normal high resistance of the circuit to ground.

5. For an electrical power distribution system having an elongated metal enclosure in a circuit which is grounded and has an elongated current carrying bus bar enclosed within the enclosure, a protective device including a metallic receptacle adapted to be removably mounted on said enclosure, a contact member carried by said receptacle and adapted to engage said bus bar, an electrical resistor in the receptacle electrically connected at one end to said contact member and electrically connected at its other end to said receptacle, the resistance value of said resistor being low in relation to the normal high resistance of the circuit to the ground, and a lamp having one of its electrodes electrically connected to said receptacle for grounding and having its other electrode electrically connected to a point on the resistor between the ends thereof suitable for the voltage of the lamp whereby dangerous potentials in the system are neutralized by said lamp and whereby said resistor neutralizes said dangerous potentials upon failure of said lamp.

ELMER T. CARLSON.